(12) United States Patent
Slinger et al.

(10) Patent No.: US 7,888,626 B2
(45) Date of Patent: Feb. 15, 2011

(54) CODED APERTURE IMAGING SYSTEM HAVING ADJUSTABLE IMAGING PERFORMANCE WITH A RECONFIGURABLE CODED APERTURE MASK

(75) Inventors: Christopher W Slinger, Malvern (GB); Keith L Lewis, Malvern (GB)

(73) Assignee: QinetiQ Limited, London (GB)

( * ) Notice: Subject to any disclaimer, the term of this patent is extended or adjusted under 35 U.S.C. 154(b) by 230 days.

(21) Appl. No.: 11/920,345

(22) PCT Filed: May 23, 2006

(86) PCT No.: PCT/GB2006/001890
§ 371 (c)(1),
(2), (4) Date: Nov. 14, 2007

(87) PCT Pub. No.: WO2006/125975
PCT Pub. Date: Nov. 30, 2006

(65) Prior Publication Data
US 2009/0095912 A1    Apr. 16, 2009

(30) Foreign Application Priority Data
May 23, 2005   (GB)   ................. 0510470.8

(51) Int. Cl.
*G01J 3/50* (2006.01)
(52) U.S. Cl. ...................................... 250/226; 250/216
(58) Field of Classification Search ................. 250/226, 250/216, 208.1, 234, 237 R, 363.04–363.1
See application file for complete search history.

(56) References Cited

U.S. PATENT DOCUMENTS
3,860,821 A    1/1975   Barrett
(Continued)

FOREIGN PATENT DOCUMENTS
DE           25 28 641        1/1976
(Continued)

OTHER PUBLICATIONS

P.C. Schaich et al, "Computer Vision for Detecting and Quantifying Gamma-Ray Sources in Coded-Aperture Images" Oct. 1994, pp. 741-748.

(Continued)

*Primary Examiner*—Que T Le
(74) *Attorney, Agent, or Firm*—Nixon & Vanderhye P.C.

(57) ABSTRACT

This invention relates to coded aperture imaging apparatus and methods. In one aspect a coded aperture imager has at least one detector array and a reconfigurable coded aperture mask means. A reconfigurable coded aperture mask means can display various coded aperture masks to provide imaging across different fields of view and/or with different resolution without requiring any moving parts or bulky optical components. More than one detector array can be used to provide large area imaging without requiring seamless tiling and this represents another aspect of the invention. The present invention also relates to the use of coded aperture imaging in the visible, ultraviolet or infrared wavebands. The use of coded aperture imaging for imaging through a curved optical element is taught as the image decoding can automatically remove any aberrations introduced by the curved element.

29 Claims, 4 Drawing Sheets

U.S. PATENT DOCUMENTS

| | | | |
|---|---|---|---|
| 3,961,191 A | 6/1976 | Stoner et al. | |
| 4,075,483 A | 2/1978 | Tancrell et al. | |
| 4,092,540 A | 5/1978 | Barrett | |
| 4,165,462 A | 8/1979 | Macovski et al. | |
| 4,209,780 A * | 6/1980 | Fenimore et al. | 382/278 |
| 5,115,335 A | 5/1992 | Soref | |
| 5,294,971 A | 3/1994 | Braunecker et al. | |
| 5,311,360 A | 5/1994 | Bloom et al. | |
| 5,448,395 A | 9/1995 | Lopez et al. | |
| 5,500,761 A | 3/1996 | Goossen et al. | |
| 5,519,529 A | 5/1996 | Ahearn et al. | |
| 5,579,149 A | 11/1996 | Moret et al. | |
| 5,636,001 A | 6/1997 | Collier | |
| 5,636,052 A | 6/1997 | Arney et al. | |
| 5,710,656 A | 1/1998 | Goossen | |
| 5,772,598 A | 6/1998 | Halling | |
| 5,784,189 A | 7/1998 | Bozler et al. | |
| 5,825,528 A | 10/1998 | Goossen | |
| 5,838,484 A | 11/1998 | Goossen | |
| 5,841,579 A | 11/1998 | Bloom et al. | |
| 5,870,221 A | 2/1999 | Goossen | |
| 5,943,155 A | 8/1999 | Goossen | |
| 5,949,571 A | 9/1999 | Goossen et al. | |
| 5,953,161 A | 9/1999 | Troxell | |
| 5,995,251 A | 11/1999 | Hesselink et al. | |
| 6,034,807 A | 3/2000 | Little et al. | |
| 6,069,361 A | 5/2000 | Rubinstein | |
| 6,195,412 B1 | 2/2001 | Tobin, Jr. et al. | |
| 6,329,967 B1 | 12/2001 | Little et al. | |
| 6,392,235 B1 | 5/2002 | Barrett et al. | |
| 6,396,976 B1 | 5/2002 | Little et al. | |
| 6,424,450 B1 | 7/2002 | Goossen | |
| 6,430,333 B1 | 8/2002 | Little et al. | |
| 6,467,879 B1 | 10/2002 | Kubby et al. | |
| 6,519,073 B1 | 2/2003 | Goossen | |
| 6,570,143 B1 | 5/2003 | Neil et al. | |
| 6,737,652 B2 * | 5/2004 | Lanza et al. | 250/363.06 |
| 6,819,463 B2 | 11/2004 | Noonan | |
| 6,856,449 B2 | 2/2005 | Winkler et al. | |
| 7,006,132 B2 | 2/2006 | Pereira et al. | |
| 7,235,773 B1 | 6/2007 | Newman | |
| 2002/0075990 A1 | 6/2002 | Lanza et al. | |
| 2003/0058520 A1 | 3/2003 | Yu et al. | |
| 2003/0122955 A1 | 7/2003 | Neidrich | |
| 2003/0164814 A1 | 9/2003 | Starkweather et al. | |
| 2003/0191394 A1 | 10/2003 | Simon et al. | |
| 2004/0008397 A1 | 1/2004 | Noonan | |
| 2004/0046123 A1 | 3/2004 | Dausch | |
| 2005/0057793 A1 | 3/2005 | Starkweather et al. | |
| 2005/0248827 A1 | 11/2005 | Starkweather et al. | |
| 2006/0038705 A1 | 2/2006 | Brady et al. | |
| 2006/0157640 A1 | 7/2006 | Perlman et al. | |
| 2007/0013999 A1 | 1/2007 | Marks et al. | |
| 2007/0091051 A1 | 4/2007 | Shen | |
| 2008/0128625 A1 | 6/2008 | Lamadie et al. | |
| 2008/0151391 A1 | 6/2008 | Zalevsky et al. | |
| 2008/0259354 A1 | 10/2008 | Gharib et al. | |
| 2008/0285034 A1 | 11/2008 | Gharib et al. | |
| 2009/0008565 A1 | 1/2009 | Gottesman | |
| 2009/0020714 A1 | 1/2009 | Slinger | |
| 2009/0022410 A1 | 1/2009 | Haskell | |
| 2009/0090868 A1 | 4/2009 | Payne | |
| 2009/0167922 A1 | 7/2009 | Perlman et al. | |

FOREIGN PATENT DOCUMENTS

| | | |
|---|---|---|
| EP | 0 318 249 | 5/1989 |
| EP | 0 663 763 | 7/1995 |
| EP | 1 341 025 | 9/2003 |
| EP | 1 627 526 | 11/2004 |
| EP | 1 491 958 | 12/2004 |
| EP | 1 494 046 | 1/2005 |
| GB | 1 449 636 | 9/1976 |
| GB | 2 314 664 | 1/1998 |
| GB | 2 350 472 | 11/2000 |
| GB | 2 414 881 | 12/2005 |
| GB | 2 418 028 | 3/2006 |
| GB | 2 434 935 | 8/2007 |
| JP | 55-146411 | 11/1980 |
| JP | 4-5620 | 1/1992 |
| JP | 9-113819 | 5/1997 |
| JP | 2003-4441 | 1/2003 |
| WO | WO 91/12502 | 8/1991 |
| WO | WO 94/18582 | 8/1994 |
| WO | WO 96/24032 | 8/1996 |
| WO | 97/26557 | 7/1997 |
| WO | WO 98/46007 | 10/1998 |
| WO | WO 00/17810 | 3/2000 |
| WO | WO 00/45608 | 8/2000 |
| WO | WO 02/44788 | 6/2002 |
| WO | WO 02/056055 | 7/2002 |
| WO | WO 02/056061 | 7/2002 |
| WO | 03/017000 | 2/2003 |
| WO | 2004/102958 | 11/2004 |
| WO | WO 2004/102958 | 11/2004 |
| WO | WO 2006/125975 | 11/2006 |
| WO | WO 2007/045875 | 4/2007 |
| WO | WO 2007/047732 | 4/2007 |
| WO | WO 2007/054769 | 5/2007 |
| WO | WO 2007/091051 | 8/2007 |
| WO | WO 2007/121417 | 10/2007 |
| WO | WO 2008/108840 | 9/2008 |
| WO | WO 2008/128625 | 10/2008 |
| WO | WO 2008/142543 | 11/2008 |

OTHER PUBLICATIONS

D. Casasent et al, "Real-time deformation invariant optical pattern recognition using coordinate transformations" *Applied Optics*, vol. 26, No. 5, Mar. 1957, pp. 938-942.

M. Gmar et al, "Development of Coded-Aperture Imaging With a Compact Gamma Camera" *IEEE Transactions on Nuclear Science*, vol. 51, No. 4, Aug. 2004, pp. 1682-1687.

A. Busboom et al, "Coded aperture imaging with multiple measurements" *J. Opt. Soc. Am. A*, vol. 14, No. 5, May 1997, pp. 1058-1065.

L. Mertz et al, "Fresnel Transformations of Images" Proceedings of the Conference on Optical Instruments and Techniques, 1961, pp. 305-312.

C. Graziani et al, "Localization of GRBs by Bayesian Analysis of Data from the HETE WXM" Feb. 6, 2008, 3 pages.

C. Graziani et al, "Determination of X-Ray Transient Source Positions by Bayesian Analysis of Coded Aperture Data" Oct. 1997, 6 pages.

U. Gopinathan et al, "Coded apertures for efficient pyroelectric motion tracking" Optics Express, vol. 11, No. 18, Sep. 2003, pp. 2142-2152.

K.W. Goossen et al, Silicon Modulator Based on Mechanically-Active Anti-Reflection Layer with 1 Mbit/sec Capability for Fiber-in-the-Loop Applications, *IEEE Photonics Technology Letters*, vol. 6, No. 9, Sep. 1994, pp. 1119-1121.

R. Accorsi et al, "High Sensitivity Dynamic Coded Aperture Imaging" IEEE 2004, pp. 1833-1837.

C. Brown, "Multiplex imaging with multiple-pinhold cameras" *Journal of Applied Physics*, vol. 45, No. 4, Apr. 1974, pp. 1806-1811.

G. Monnelly et al, "HETE Soft X-ray Camera Imaging: Calibration, Performance, and Sensitivity" *Gamma-Ray Burst and Afterglow Astronomy 2001: A Workshop Celebrating the First Year of the HETE Mission*, 2003, pp. 49-55.

A.P. Wood et al, "Hybrid optics in dual waveband infrared systems" SPIE vol. 3482, 1998, pp. 602-613.

D.A. Fish, "Scanning singular-value-decomposition method for restoration of images with space-variant blur" *J. Opt. Soc. Am. A*, vol. 13, No. 3, Mar. 1996, pp. 464-469.

S.H. Moseley et al, "Microshutters Arrays for the JWST Near Infrared Spectrograph" *Proc. SPIE*, vol. 5487, 645, Oct. 2004, 8 pages.

K. Lewis et al, "Micromachined Modulator Arrays for Use in Free-Space Optical Communication Systems" *Proc. of SPIE*, vol. 5614, 2004, pp. 24-30.

A.S. Kutyrev et al, "Programmable Microshutter Arrays for the JWST NIRSpec: Optical Performance" IEEE Journal of Selected Topics in Quantum Electronics, vol. 10, No. 3,May 2004, pp. 652-661.

International Search Report for PCT/GB2006/001890 mailed Aug. 28, 2006.

Great Britain Search Reports for Application No. 0510470.8 dated Aug. 16, 2005, Nov. 8, 2005, and Nov. 10, 2005.

Tam et al., "Spatial-Light-Modulator-Based Electro-Optical Imaging System," Rapid Communications, *Applied Optics*, vol. 31, No. 5, 1992, pp. 578-580.

Sun et al., "Method for Reduction of Background Artifacts of Images in Scanning Holography with a Fresnel-zone-plate Coded Aperture," *Applied Optics*, vol. 43, No. 21, 2004, pp. 4214-4218.

Fenimore et al., "Coded Aperture Imaging with Uniformly Redundant Arrays," *Applied Optics*, vol. 17, No. 3, 1978, pp. 337-347.

O.P. Ivanov, "Control and Image Decoding Software for Portable Gamma-Ray Imaging System with Coded Aperture" Nuclear Science Symposium, 1999, Conference Record, 1999, pp. 459-463.

Office Action mailed Mar. 29, 2010 in co-pending U.S. Appl. No. 12/278,470.

Office Action mailed Feb. 23, 2010 in co-pending U.S. Appl. No. 12/278,528.

Office Action mailed Mar. 11, 2010 in co-pending U.S. Appl. No. 12/278,521.

International Search Report mailed Mar. 5, 2010 for PCT/GB2009/00-2780.

T.M. Cannon et al, "Coded aperture imaging: many holes make light work" *Optical Engineering*, vol. 19, No. 3, May 1980, pp. 283-289.

J.E. Grindlay et al, "Optimizing wide-field coded aperture imaging: radial mask holes and scanning" *Proceedings of SPIE*, vol. 5168, Aug. 2003, pp. 402-410.

R. Rocchia et al, "A Multiplex Imaging Spectrometer for Low Energy X-Ray Astronomy" *Astrophysics and Space Science*, vol. 96, Oct. 1983, pp. 361-374.

Office Action mailed Aug. 26, 2009 in co-pending U.S. Appl. No. 12/278,528.

U.S. Appl. No. 12/373,946, filed Jan. 15, 2009, Strens.
U.S. Appl. No. 12/278,528, filed Aug. 6, 2008, Payne.
U.S. Appl. No. 12/278,524, filed Aug. 6, 2008, Slinger.
U.S. Appl. No. 12/278,521, filed Aug. 6, 2008, Slinger.
U.S. Appl. No. 12/278,515, filed Aug. 6, 2008, Haskell.
U.S. Appl. No. 12/278,500, filed Aug. 6, 2008, McNie.
U.S. Appl. No. 12/278,470, filed Aug. 6, 2008, Slinger.
U.S. Appl. No. 60/792,335, filed Apr. 17, 2006, Brady.
U.S. Appl. No. 60/726,655, filed Oct. 17, 2005, Brady.

International Search Report dated Dec. 23, 2009 for PCT/GB2009/001870.

UK Search Report dated Mar. 19, 2009 for GB 0822281.2.

T.M. Cannon et al, "Tomographical imaging using uniformly redundant arrays" *Applied Optics*, vol. 18, No. 7, Apr. 1979, pp. 1052-1057.

G.D. de Villiers et al, "Positive solutions to linear inverse problems" *Inverse Problems*, 15, 1999, pp. 615-635.

G.D. de Villiers et al, "Sub-pixel super-resolution by decoding frames from a reconfigurable coded-aperture camera: theory and experimental verification" *Proc. of SPIE*, vol. 7468, 2009, pp. 746806-1 to 746806-9.

M. Gutin et al, "Agile, detecting and discriminating, infrared electro-optical system (ADDIOS) application to coded aperture imaging and non-imaging sensor systems" Proc. of SPIE, vol. 6714, 2007, pp. 671406-1 to 671406-12.

A. Mohan et al, "Sensing Increased Image Resolution Using Aperture Masks" IEEE, 2008.

C. Slinger et al, "Coded aperture systems as nonconventional, lensless imagers for the visible and infrared" Proc. of SPIE, vol. 6737, 2007, pp. 67370D-1 to 67370D-10.

Translation of Japanese Notice of Rejection mailed Sep. 14, 2010 in JP 2008-512909.

Office Action mailed Aug. 31, 2010 in co-pending U.S. Appl. No. 12/278,528.

Office Action mailed Sep. 30, 2010 in co-pending U.S. Appl. No. 12/278,470.

Office Action mailed Oct. 19, 2010 in co-pending U.S. Appl. No. 12/278,500.

\* cited by examiner

Figure 1
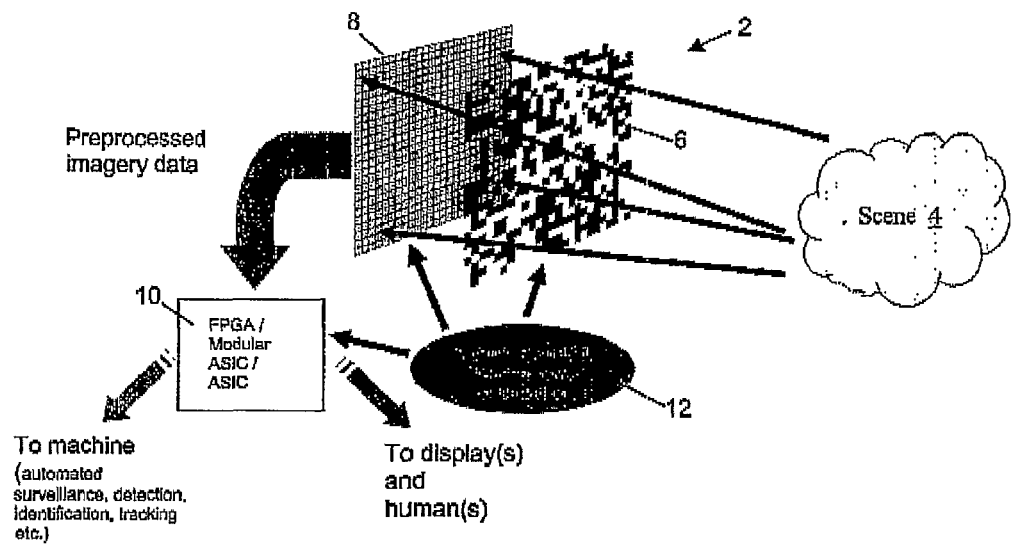
Figure 2
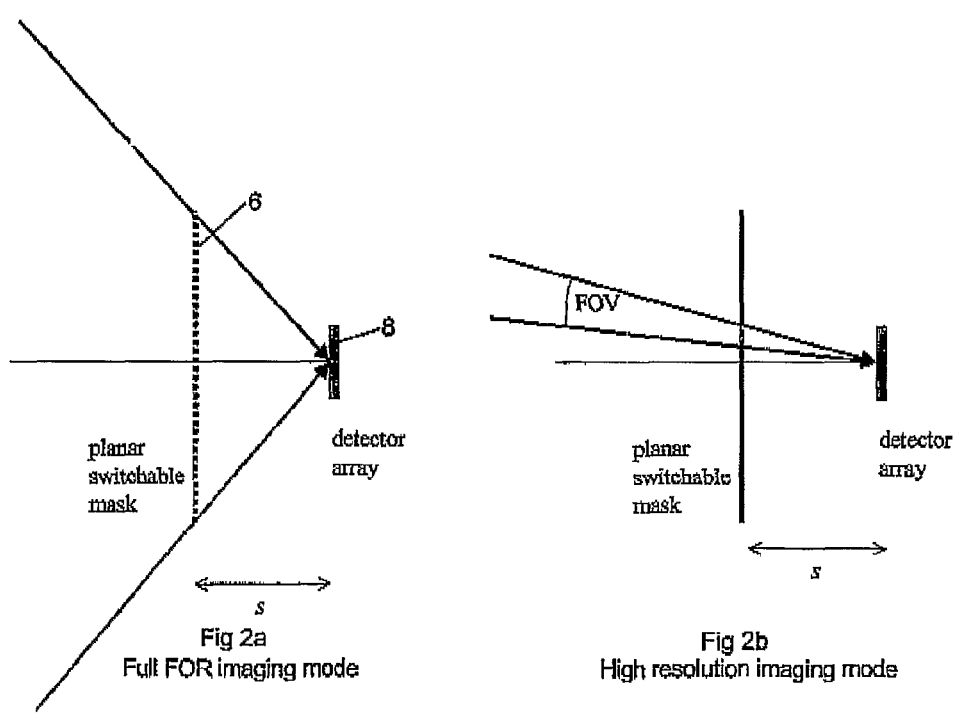
Fig 2a
Full FOR imaging mode
Fig 2b
High resolution imaging mode

CODED APERTURE IMAGING SYSTEM HAVING ADJUSTABLE IMAGING PERFORMANCE WITH A RECONFIGURABLE CODED APERTURE MASK This application is the U.S. national phase of International Application No. PCT/GB2006/001890, filed 23 May 2006, which designated the U.S. and claims priority to Great Britain Patent Application No. 0510470.8, filed 23 May 2005, the entire contents of each of which are hereby incorporated by reference.

BACKGROUND OF THE INVENTION

1. Field of the Invention

This invention relates to a coded aperture imaging system having a reconfigurable coded aperture mask, especially to an imaging system having adjustable imaging performance without requiring moving parts and to coded aperture imaging apparatus for operation at ultra violet, visible and infrared wavelengths.

2. Discussion of Prior Art

Optical systems for observing scenes are employed in a wide range of situations from CCTV security systems to surveillance/reconnaissance systems. Often these systems are required to be such that the imaging performance of the system can be adjusted, for example, in terms of resolution or image update rate. Another example is where there is a requirement for the imager to be scanned over a large field-of-regard (FOR) the FOR being many times larger than the instantaneous field-of-view (FOV).

Mechanical scanning of optical systems is well known, for instance movement of a lens or a mirror arrangement can change the FOV in the FOR or the whole imaging system may be moved. However movement of optical components requires generally bulky and heavy mechanical moving means and in some applications minimising size and weight are important. Further mechanically scanned systems can generate unwanted vibrations which can distort the acquired image. Also rapid movement of large and heavy optical components or the whole system, which can have a large moment of inertia, can be problematic.

It is also known to a use a spatial light modulator (SLM) to display a diffractive pattern with a detector array so as to achieve a scanning imaging system, see for example published PCT application WO2000/17810. Different diffractive patterns can be displayed which direct radiation from different parts of the scene to a detector. Thus scanning is achieved without any moving parts which can reduce the weight and bulk of the optical system. Such diffractive optics are usually useful over a narrow band (monochromatic), as they are highly dispersive. They are often inefficient too.

SUMMARY OF THE INVENTION

It is an object of the present invention to provide an imaging system which mitigates at least some of the above mentioned disadvantages and provides a degree of more general imager adaptability.

Thus according to the present invention there is provided a coded aperture imaging system having an detector array and a coded aperture mask means wherein the coded aperture mask means is reconfigurable.

Coded aperture imaging is a known imaging technique which is primarily used in high energy imaging such as X-ray or γ-ray imaging where suitable lens materials do not generally exist, see for instance E. Fenimore and T. M. Cannon, "Coded aperture imaging with uniformly redundant arrays", Applied Optics. Vol. 17, No. 3, pages 337-347, 1 Feb. 1978. It has also been proposed for three dimensional imaging, see for instance "Tomographical imaging using uniformly redundant arrays" Cannon T M, Fenimore E E, Applied Optics 18, no. 7, p. 1052-1057 (1979)

Coded aperture imaging exploits the same principles as a pinhole camera but instead of having a single small aperture uses a coded aperture mask having an array of apertures. The small size of the apertures results in a high angular resolution but increasing the number of apertures increases the radiation arriving at the detector thus increasing the signal to noise ratio. Each aperture passes an image of the scene to the detector array and so the pattern at the detector array is an overlapping series of images and is not recognisable as the scene. Processing is needed to reconstruct the original scene image from the recorded data. The reconstruction process requires knowledge of the aperture array used and the aperture array is coded to allow subsequent good quality image reconstruction. Coded aperture imaging is therefore quite different to conventional imaging techniques. In conventional imaging the spatial intensity pattern farmed at the detector array is the in focus image acquired by the system optics. In a coded aperture imager the intensity pattern formed at the detector array is a coded image pattern related to image and to the coded aperture array.

The use of a reconfigurable coded aperture mask means allows different coded aperture masks to be displayed at different times. This allows, for example, the direction and FOV of the imaging system to be altered without requiring any bulk moving parts. Further the resolution of the imaging system can also be altered by changing the coded aperture mask displayed on the coded aperture mask means. It is also possible to image the same scene using a plurality of different coded aperture arrays, i.e. to acquire multiple frames of a scene each being acquired with a different mask. Multi-frame imaging can improve image quality and the present invention allows the rapid acquisition of several different frames each with a different mask, each of which can be freely adapted as required. Known coded aperture imaging systems use a fixed mask, rather than a reconfigurable mask means. As used herein the term reconfigurable, in relation to the mask means, is used to mean that mask means has a reconfigurable area within which the mask patterns can be provided and that any part of the mask means within the reconfigurable area may be set to be opaque (i.e. stopping radiation from the scene reaching the detector array) or transmissive (allowing radiation from the scene to reach the detector) as required. For instance the reconfigurable mask means may be pixilated with each active pixel being able to be individually set to be transmissive or opaque so as to provide a plurality of different possible masks.

International Patent Application WO97/26557 to All Systems Inc describes a coded aperture imaging system having a mask which exhibits a square anti-symmetric uniformly redundant array. The mask pattern is arranged such that the coded aperture array exhibits a first pattern at a first position and a second, complementary pattern at a second, rotated position. Thus two different but complimentary mask patterns can be provided by rotating the mask about its axis. The use of two complimentary patterns is useful for eliminating background noise. The coded aperture mask means of WO97/26657 allows a fixed mask to be repositioned to provide a new array pattern—however the mask means is not a reconfigurable mask means and of no control over the size or direction of the field of view or resolution of the resulting image. The system is also limited to a maximum of two different masks with no flexibility over the coded aperture arrays used.

The pattern displayed on the coded aperture mask means, i.e. over the whole area of the mask means, is referred to herein as a coded aperture mask. At least part of the coded aperture mask is a coded aperture array. A coded aperture array is a patterned array of apertures that allow radiation to reach the detector array from the scene in a manner such that the radiation pattern formed at the detector array, although not recognisable directly as a scene image, can be processed to reveal a scene image. The area of the coded aperture mask forming the coded aperture array may be all or only some of the coded aperture mask means. That is either the whole pattern displayed on the mask means is a coded aperture array or, as described in more detail below, only part of the pattern is a coded aperture array with the rest of the mask blocking radiation from reaching the detector. The skilled person will be well of aware of the coded aperture arrays that can be displayed. For the avoidance of doubt the term aperture used herein does not imply a physical hole in the mask means but merely an area of the pattern which allows radiation to reach the detector and the coded aperture array could be transmissive or reflective. The coded aperture array is the area within which the deliberate pattern of apertures is located.

Preferably therefore the coded aperture mask means is reconfigurable to provide coded aperture masks which provide different fields of view for the system. In this way the imaging system performance can be altered within a field of regard that can be many times larger without needing any macroscopic moving parts. The different coded aperture masks may be arranged such that only part of the coded aperture mask comprises a coded aperture array and the position of the coded aperture array in the mask defines the field of view. In other words only a portion of the mask means may be used to define a coded aperture array with the rest of the mask blocking radiation from reaching the detector array. Therefore the only radiation from the scene that can reach the detector array is that passing through the coded aperture array and hence the location of the coded aperture array relative to the detector array and the size of the coded aperture array will define the field of view of the system. Moving the position of the coded aperture array within the mask displayed on the mask means will after the direction from which radiation can reach the detector array and so will alter the direction and size of the field of view. Thus the total size of the mask means defines the field of regard of the system and can be much larger than the size of a coded aperture array written to the reconfigurable mask means but the field of view can be controlled, for instance to provide scanning or to track an object in the scene.

Preferably the coded aperture mask means is reconfigurable to provide coded aperture masks having different resolutions. For instance different coded aperture masks could be displayed having coded aperture arrays with different effective aperture sizes and spacing. The coded aperture mask means may also be reconfigurable to provide coded aperture masks having different coded aperture arrays.

Also the ability to change the mask pattern can be advantageous in increasing imaging performance compared to a fixed mask system, e.g by combining the detected intensifies from multiple mask patterns increased image resolutions and/or quality can be achieved. Several mask patterns may be used to image the same scene to improve image processing, for instance there may be more than two mask patterns used— depending on the requirement five or more or ten or more different mask patterns may be used. The mask patterns used or the combination of mask patterns used are freely adaptable and vary in response to scene evolution for instance.

The present invention is particularly applicable to multi-functional, high resolution imaging in the visible, near infrared, thermal infrared or ultra-violet wavebands, such as might be employed in surveillance. Nearly all imaging systems of this sort employ refractive, reflective or diffractive optical components and the skilled person would not think that coded aperture imaging would be applicable thereto. Coded aperture imaging, by its very nature, blocks a substantial amount of radiation from the field of view reaching the detector and thus can reduce signal to noise ratio of the detected radiation. Furthermore signal processing techniques must be performed an the detected output to decode and recover the imaged scene. The effects of diffraction can also be significant when considering high resolution coded aperture imaging at visible, UV or IR wavelengths. Coded aperture imaging has generally been used for high energy radiation imaging or particle imaging. For such applications the aperture sizes and mask to detector spacings are such that diffraction effects are not significant. When using visible waveband radiation for high resolution imaging diffraction effects start to blur the patterns formed at the detector array, making reconstruction more difficult. Therefore the skilled person would previously have ignored coded aperture imaging as being useful for visible or nearby waveband imaging systems. Nevertheless the present inventors have realised that not only is coded aperture imaging applicable to multifunctional imaging, including at visible, UV and IR wavelengths, but it has several advantages when applied thereto.

As mentioned when using a relatively large coded aperture mask means a variety of different sized coded aperture arrays can be provided at different parts of the mask to give a variety of different fields of view of varying resolution without requiring any moving parts. Also, as a series of scene images overlap at different positions on the detector array, should there be any dead pixels, in the mask and/or the detector array, a complete image will still be obtained and the effect of the dead pixels avenged out over the entire image. This means no information is missed which is useful for surveillance type applications. Furthermore as mentioned the image recorded by the detector array does not replicate the scene in the field of view. It is only after the recorded image is processed that the original scene image can be recovered. This previously would have been seen as a disadvantage. However where the imaging system is being used remotely and is communicating the images recorded back to a base station or where images are recorded for later analysis it is noted that the information recorded is effectively encrypted. A naturally encrypted off detector datastream is produced which can give security against interception or interference. Furthermore the encryption key (effectively the mask pattern) can be changed at will, as the mask is reconfigurable. It is also noted that with a coded aperture imaging system light from any single location in the scene is not focussed onto a single part of the detector array so the system would also offer protection against damage from bright sources, e.g. laser sources.

The coded aperture mask means may be reconfigured such that the coded aperture mask has a plurality of distinct coded aperture arrays at different locations of the mask. In other words two or more distinct coded aperture arrays are used simultaneously at different locations on the mask. Each coded aperture array will therefore pass radiation from a different part of the scene to the detector. Obviously the intensity pattern at the detector will comprise elements from each coded aperture array. However the resultant intensity signal can be processed to reconstruct a scene image associated with each coded aperture array. In other words the imager is capable of imaging in a plurality of different directions simultaneously, each using the full resolution of the detector. The invention therefore allows an imager with multiple foveal patches.

The different coded aperture arrays may have different resolutions and/or sizes. For instance one coded aperture array of the coded aperture mask may have a very high resolution and thus provide a detailed view of one part of the scene whereas another coded aperture array has a lower resolution for a different part of the scene.

Each coded aperture array is preferably uncorrelated with the other coded aperture arrays. i.e. there should be no significant peaks in the cross correlation between the individual mask patterns.

The coded aperture mask means may be planar or non-planar. For instance the mask means may be conformal with an aperture in a device. A curved coded aperture mask means can optimise the field of regard of the imaging system. For instance a curved coded aperture mask means can increase the FOV for a given system aperture compared with a planar coded aperture means. Additionally a non-planar coded aperture masks means could have a predetermined shape so that, in use, the coded aperture mask means is conformal with the shape of the platform. For instance an imaging system of the present invention could be embedded in an aircraft or other airborne platform, for instance in a wing or in the aircraft nose.

A conventional imaging system would usually have to be located in a housing behind a window in the aircraft exterior. To avoid the effects of the window causing aberration in the image the window would generally have to be hemispherical or flat so that the optical effect of the window did not introduce unacceptable image aberrations or distortions. This may involve using an non optimal window shape which may increase drag, require more robust fixings etc.

The present invention allows use of a curved or faceted coded aperture mask means which is conformal with the shape of the platform it is mounted on. In the aircraft example the coded aperture mask means could be conformal with the window and located adjacent thereto. This ensures that the input aperture of the system is maximised and gives an optimal field of view without requiring a deviation from the shape of the platform. In some cases where the coded aperture mask means is robust enough for the environment in which it will be operated the coded aperture mask means may form the window. The use of a coded aperture imager with a non-planar coded aperture mask, whether or not reconfigurable, represents another aspect of the present invention.

Another advantage of the present invention is that a coded aperture mask means, whether planar or curved, can be used to image through a curved or faceted surface that need not be hemispherical. The particular coded aperture array and processing algorithm used at any field of view can compensate for any differences in the optical effects of the curved surface at different fields of view. The use of a coded aperture imager arranged to image through a curved surface represents another aspect of the present invention and the invention also provides an imaging system having a coded aperture imager arranged to image through a non-planar element. The non-planar element obviously must be at least partially transmissive to radiation at the wavelength of operation and may, for example, comprise a window in a surface. As mentioned the non-planar element need not be hemispherical and indeed could be non-regular and yet the imaging system of this aspect of the invention will still produce an aberration free image. The coded aperture imager of this aspect of the invention comprises at least one detector and a coded aperture mask means and may conveniently be a coded aperture imager according to the first aspect of the invention. The non-planar element may form part of the external surface of a platform, such as an air vehicle, and may be aerodynamic in shape, i.e. the shape of the non-planar element is dictated mainly by aerodynamic considerations.

The reconfigurable coded aperture mask means of the first aspect of the invention may be any reconfigurable device which is capable of displaying a coded aperture array over at least part of its surface. The mask means may be pixilated and each pixel should be switchable between being transmissive and opaque. Note as used herein the term transmissive should be taken as meaning allowing at least some incident radiation at that pixel to pass from the mask toward the detector array and opaque should be read as blocking at least some incident radiation at that pixel from passing toward the detector array, with a transmissive pixel allowing significantly more radiation to reach the detector than an opaque pixel. The reconfigurable mask means could be a reflective device, such as a digital micro-mirror device, where the reflectivity of the pixels is altered to either reflect radiation from the scene to the detector array (transmissive) or not (opaque).

The reconfigurable coded aperture mask means may have a controller, the controller being adapted to write at least one coded aperture mask to the coded aperture mask means. The controller could be pre-programmed with a plurality of different coded aperture masks and be adapted to write a particular mask to the reconfigurable mask means at a particular time. For instance the controller could write a mask corresponding to low resolution surveillance mode until a target is detected and then write a mask corresponding to a high resolution narrow FOV coincident with the detected target.

The coded aperture mask means is preferably reconfigurable in a relatively short timescale. The mask means may be preferably reconfigurable in less than 15 ms, or less than 10 ms or less than 5 ms. The resolution of the coded aperture mask means preferably has a resolution to match that of the detector array likely to be used in the system, which may for example be in the region of 5 µm in the visible band through to 25 µm in the longwave thermal infrared band. A pixel in the coded aperture array can be formed from a group of several individual pixels of the coded aperture mask means. Thus a mask means with larger effective pixels can be simulated by combining groups of pixels.

As mentioned the imaging system of the present invention can be applied to imaging in the ultraviolet band and so may operate at a wavelength or range of wavelengths of approximately 380 nm or less and/or approximately 10 nm or more. The invention can also be applied to visible band imaging and so may operate at a wavelength or range of wavelengths of approximately 780 nm or less and/or approximately 380 nm or more. The invention can also be applied to infrared band imaging and so may operate at a wavelength or range of wavelengths of approximately 780 nm or more and/or approximately 1 mm or less. For example the imaging system could be used in the mid IR waveband, i.e. at a wavelength of 3 µm or above and/or 5 µm or below, or the long wave IR band, i.e. a wavelength of 8 microns or above and/or 14 µm or below. However the skilled person will appreciate that other wavelength ranges could be used as appropriate.

Preferably the coded aperture mask means is bistable, i.e. pixels can exist in one of two stable transmission states without the application of power. This has the advantage that once the coded aperture mask means has been configured to a particular mask no power is needed to maintain that mask.

The coded aperture mask means may comprise at least one spatial light modulator. The spatial light modulator may be a liquid crystal device. Liquid crystal devices are operable in the visible and infrared bands and are rapidly switchable. Bistable liquid crystal devices are known, e.g. ferroelectric liquid crystal devices. Other suitable reconfigurable mask means include MEMS or MOEMS modulators, electrochromic devices, electrophoretic devices and electro-optic modulators. For example, for infrared applications vanadium dioxide modulators may be used.

The detector array preferably has high sensitivity and dynamic range, good signal to noise characteristics, high pixel counts and small pixel spacing. The detector array used will obviously depend on the wavelength of operation. For visible and near infrared wavebands CMOS detector arrays or CCD arrays may be used. For the thermal infrared band a number of cooled or uncooled detector technologies are available including cadmium mercury telluride (CMT) and indium antimonide (InSb) detector arrays. In applications requiring a large detector array there may be more than one detector array arranged adjacent one another. The present invention therefore allows a large area detector to be realised using a plurality of smaller detector arrays. In fact the use of coded aperture imaging has advantages for large area imaging. As mentioned above as a series of scene images overlap at different positions on the detector array, should there be any dead pixels a complete image will still be obtained and the effect of the dead pixels averaged out over the entire image. The same holds true for any gaps between adjacent detector arrays. Unlike conventional imaging, where a gap between detector arrays would result in a gap in the image, the effect of any gap between detector arrays in a CAI system will be averaged out and a complete image may still be obtained. This is advantageous as standard detector arrays tend to have wiring/addressing circuitry arranged around the periphery of the array. Thus a plurality of standard detector arrays, having an active detector area and a non-active peripheral area, can't be tiled seamlessly together to form a larger detector such that the active areas are coterminous, i.e. the end of one active area sees the start of the neighbouring detector area. Therefore large area imaging requires custom detectors and there are limits on the size of detector array that can be produced. Using a coded aperture imaging system however standard detector arrays can be used and the averaging effect means that large area seamless imaging or non standard aspect ratio imaging can be achieved relatively simply and inexpensively. This is applicable to imaging systems having a fixed field of view, i.e. a fixed coded aperture mask, or a variable field of view using a reconfigurable coded aperture mask means.

Therefore in another aspect of the invention there is provided a coded aperture imaging system having a plurality of detector arrays arranged to receive radiation from a scene through a coded aperture mask. As mentioned each detector array has an active detector area for receiving radiation and a non-active peripheral area and the active area of at least one detector array is not coterminous with the active area of a neighbouring detector array. All of the embodiments and advantages described herein with respect to the other aspects of the invention are applicable hereto to the aspect using multiple detector arrays.

Although planar detector arrays are preferred in all aspects of the invention—due to ease of manufacture and hence availability and cost, if required the detector array be curved or faceted.

As mentioned above the radiation pattern arriving at the detector array can be thought of as a series of overlapping images of the scene, one from each aperture, and signal processing is required to decode the detected pattern. The system may therefore include a processor for decoding the output of the detector array to produce an image. Preferably the processor is adapted to apply a variety of decoding algorithms to decode the image. Where the system is arranged to image through a curved surface the decoding algorithm compensates for any aberration effects caused by radiation passing through the curved surface.

A number of different decoding algorithms could be used. The algorithm used will depend on the particular application that the imaging system is being used in, and may also be influenced by the required frame rate, image quality and available signal processing resources. Different algorithms could be stored to be used in certain situations.

Conveniently the decoding algorithm may comprise a deconvolution algorithm. Alternatively the decoding algorithm may comprise a cross-correlation algorithm. The decoding may include an iterative search of solution space to recover images, for example maximum entropy methods and iterative removal of sources. The processing may be adapted to perform one or more of the above mentioned decoding algorithms.

The skilled person will appreciate that, in the diffraction free case, the signal recorded at the detector array of a coded aperture imaging system can be described as a convolution of the scene intensity with the aperture function of the coded aperture array plus some noise. The object of all decoding algorithms is therefore to recover the scene image by using knowledge of the mask pattern, for instance by performing a deconvolution or cross correlation.

Where diffraction effects are significant however the intensity pattern at the detector array no longer corresponds directly to the aperture function. Instead the diffraction pattern formed at the detector array is in effect a blurred version of the mask pattern. Thus a decoding algorithm based on the aperture function of the coded aperture array will result in a blurred image.

Processing the image may therefore involve a multistage process. In a first step a first image of the scene is formed. This first image will be blurred due to any diffraction effects. At least one image enhancement step may then be applied to improve image quality.

The step of forming the first image may use any of the processing techniques known for conventional coded aperture array. Preferably however, as image deconvolution is an ill posed inverse problem various techniques applicable to the solution of ill posed inverse problems may be applied. In one preferred embodiment a Tikhonov regularisation technique may is applied in producing the first image. Tikhonov regularisation is a known technique in the solution of inverse problems, see for example page 108 of "Introduction to Inverse Problems in Imaging", M. Bertero & P. Boccacci, Institute of Physics Publishing, 1998, ISBN 0750304359 (hereinafter referred to as Bertero & Boccacci). Alternatively a Weiner filter technique could be applied. An iterative technique such as the Landweber iteration could also be used, see page 291 of Bertero & Boccacci.

In order to further improve image quality at least one image enhancement step may be performed on the first blurred image. The blurred image can be seen as the true image convolved with a point spread function. The step of image enhancement is then to recover the true image.

Preferably the image enhancement step involves dividing the first image into a series of image regions over which the point spread function is relatively invariant and processing these sub-images to improve quality. Dividing the image into a plurality of small image areas not only ensures that the point spread function is spatially invariant for that area but it also eases the computation as compared with attempting to process the entire image. Preferably the inverse problem is solved over each small image region and the values of the solution at the centre of the region are retained as the solution. The region is then moved by a number of pixels and the process repeated.

Preferably solving the inverse problem for each image region is Tikhonov regularisation which may be accomplished using Fourier methods. Alternatively a truncated singular function expansion could be used as proposed in "Scanning singular-value decomposition method for restoration of images with space-variant blur", D A Fish, J Grochmalicki and E R Pike, J. Opt. Soc. Am A, 13, no. 3 1996, pp 464-469. This is a more computationally intense method that Tikhonov regularisation. This method requires calculation of the singular value decomposition (SVD) associated with the point-spread function. However if the point-spread function is spatially invariant then the SVD just needs to be calculated once for treating the entire image.

Since coded aperture imaging involves incoherent imaging the true image has to be non-negative. This prior information can be included in the solution of the inverse problem (see, for example; G D de Villiers, E R Pike and B McNally—Positive solutions to linear inverse problems, Inverse Problems 15, 1999 pp. 615-635).

Positivity may also be incorporated into the solution using a variant of the Landweber iteration and this is potentially easier to implement (see Bertero and Boccacci, page 291). Note that the Richardson-Lucy method (also known as the Expectation Maximization method) has similar performance to the projected Landweber method though it is computationally more intensive (Bertero and Boccacci, page 179).

Where one has prior knowledge that the image has a small number of point targets the image enhancement step may additionally or alternatively may use of super-resolution methods involving curve-fitting.

If the coded aperture imager is to be used for tracking then high-resolution patches may only be needed where tracking is being carried out. This would cut the computational load significantly. Therefore the method may involve the step of performing image enhancement only at parts of interest of the image, i.e. moving parts of the scene or areas of possible or confirmed targets.

The image enhancement step may also involve combining data from a plurality of images of the scene. By taking several images of the scene using different coded aperture masks it is possible to generate additional information about the scene. In essence on can impose some statistical structure on the data.

Specifically where the coded aperture imager is used for target tracking information from more than one image can be combined. Preferably a track-before-detect scheme is used. Track Before Detect algorithms have been previously used in the radar and sonar fields and use date from several acquisitions of data from the sensor together to improve target identification. A similar approach could be used to different images from a coded aperture imaging system.

The image processing may therefore employ a three stage process, in the first stage a first image of the scene is produced. This will be a blurred image of the scene due to diffraction effects. In a second stage the image may be divided into image regions and each processed to improve image quality. Finally in a third stage data from other images may be combined to further improve the image quality of at least part of the image.

As mentioned the quality of the decoded image can be increased by taking multiple frames of the scene, each captured using a different coded aperture array. The present invention, using a reconfigurable mask means, can very readily change the coded aperture mask means and acquire a plurality of frames of the scene. The different frames could be combined together with appropriate weightings (as can the mask aperture functions for the different coded aperture arrays).

The processor itself can be a digital signal processor implementing a variety of algorithms to decode the images. The gives the imaging system an added degree of flexibility, when used in combination with the reconfigurable coded aperture masks. Appropriate signal processing hardware include on-detector-chip processing, microprocessors, CPUs or Graphical Processors (GPUs) or clusters thereof, field programmable gate arrays and application specific integrated circuits or any combination of these.

As mentioned above however the detector output is a naturally encrypted image and so in some applications the system may include a transmitter or a recorder for transmitting/recording the detector output for subsequent decoding. The coded aperture array used may be varied from time to time, either periodically or in response to some external indication, in order the change the encryption 'key'.

The present invention therefore provides an adaptable imaging system operable in the a range of wavebands including the visible and the ultraviolet. As mentioned above previous coded aperture imaging systems have not been thought suitable for imaging in the visible or ultraviolet wavebands. Therefore in another aspect of the invention there is provided a visible band imaging system comprising a detector array and a visible band coded aperture mask means. Thus the present invention also applies to mask means and decoding algorithms which can be used with visible band systems. Similarly in another aspect of the invention there is provided an ultraviolet band imaging system comprising a detector array and an ultraviolet band coded aperture mask means. All of the embodiments and advantages of the first aspect of the invention are applicable to these aspects of the invention—in particular the visible band coded aperture mask means and ultraviolet band coded aperture mask means may be reconfigurable.

In addition to varying the FOV, another example of the reconfigurable imaging performance provided by this invention is that, by making the coded aperture array of coarse structure (i.e. large pixels and pixel spacings), the image resolution and processing load of the digital signal processor can be reduced, allowing faster image decoding for a given amount of signal processing resources or system energy consumption.

In another aspect of the present invention there is provided a method of imaging comprising the steps of arranging a detector array to view a scene through a reconfigurable coded aperture array means and writing a coded aperture mask to the coded aperture mask means. The method of the present invention has all of the advantages as described above in relation to the first aspect of the invention.

The method may involve writing a first coded aperture mask to the coded aperture mask means and subsequently writing a second coded aperture mask to the coded aperture mask means, the first and second coded aperture masks having different fields of view and/or resolution. Further different coded aperture masks may be written as required. As described above the FOV of the coded aperture masks can be changed by changing the location of the coded aperture array within the mask, i.e. where it appears on the coded aperture mask means. The resolution can be changed by changing the spacing and size of the apertures in the array. Multifoveal patches can be provided on the coded aperture mask means to provide separate high quality images.

The method preferably comprises the step of decoding the output of the detector array to provide an image. This can be done either directly on the output of the detector array by a local processor or the output can be transmitted for remote decoding or recorded and processed later. The step of decoding comprises applying one or more of a deconvolution algorithm, a cross-correlation algorithm and an iterative solution search.

BRIEF DESCRIPTION OF THE DRAWINGS

The invention will now be described by way of example only with reference to the following drawings of which, FIG. 1 shows schematically a coded aperture imaging system according to the present invention, FIG. 2 shows a simple planar coded aperture mask means operable in two modes; a) a full FOR low resolution imaging mode and b) a high resolution narrow FOV imaging mode.

DETAILED DISCUSSION OF EMBODIMENTS

Figure 3:
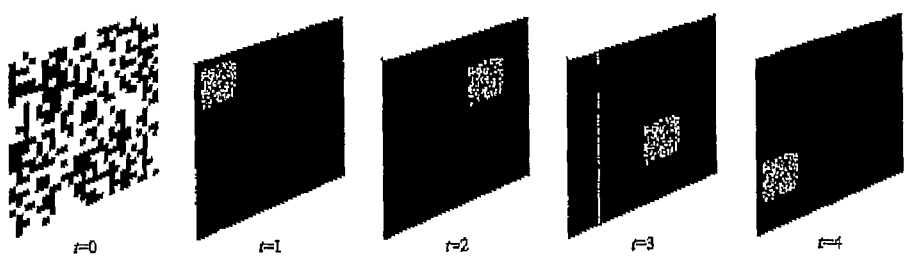
FIG. 3 illustrates some mask patterns that may be used at different times.

Conventional camera systems produce a focused image at the focal plane of its lens system, which effectively fixes the depth of the camera. In such systems, the focusing lens provides the required element of pre-detector processing by introducing a radially-varying phase shift, which enables an image to be produced by the time that the individual ray bundles have propagated to the focal plane of the lens. Fresnel diffractive lens systems and zone plates produce the necessary phase shifts using thinner structures, but still require the propagation of the individual ray bundles by the same distance. Conventional reflective and refractive lens systems constrain current camera designs and high performance systems are relatively bulky and costly to produce. The adaptability of such camera systems is also limited and steering the field of view for instance can involve moving bulky optical components with a large moment of inertia.

The present invention uses coded aperture imaging (CAI) in a lightweight, adaptable imaging system. CAI is based on the same principles as a pinhole camera. In a pinhole camera, images free from chromatic aberration are formed at all distances away from the pinhole, allowing the prospect of more compact imaging systems, with a much larger depth of field. However, the major penalty is the poor intensity throughput, which results from the small light gathering characteristics of the pinhole. Nevertheless, the camera is still able to produce images with a resolution determined by the diameter of the pinhole, although diffraction effects have to be considered. The light throughput of the system can be increased by several orders of magnitude, while preserving angular resolution, by using an array of pinholes. Each detector element sees the result of the summation of contributions from the various pinholes, corresponding to each viewpoint of the scene.

Another way of understanding the operating principle of CAI is to observe that this is a purely geometric imaging technique. Light from every point in a scene within the field of regard (FOR) of the system casts a shadow of the coded aperture onto the detector array. The detector measures the intensity sum of these shadows. The coded aperture is specially designed such that its autocorrelation function is sharp with very low sidelobes. Typically pseudorandom or uniformly redundant arrays (URA) (such as described in E. Fenimore and T. M. Cannon, "Coded aperture imaging with uniformly redundant arrays". Applied Optics, Vol. 17, No. 3, pages 337-347, 1 Feb. 1978) are used where a deconvolution of the detector intensity pattern can yield a good approximation to the point distribution in the scene.

FIG. 1 shows schematically an example of coded aperture imaging system, generally indicated 2. Rays of light from points in the scene 4 fall onto a reconfigurable mask means 6 displaying a mask. In this example the entire mask forms a particular coded aperture array. The coded aperture array acts as a shadow mask and therefore a series of overlapping coded images are produced on the detector array 8. At each pixel on the detector array, the intensities from the overlapping, coded images are summed. The output from the detector array 8 is passed to a processor 10 where image of the scene can be subsequently decoded from the detector signals using a variety of digital signal processing techniques. The coded aperture mask means is controlled by a controller 12 which controls the reconfigurable mask means to display different coded aperture masks.

As shown in FIG. 2 the size and relationship of the reconfigurable mask means 6 to the detector array 8 defines the field of regard of the imaging system. FIG. 2a shows the reconfigurable mask means displaying a mask having a coarse coded aperture array across its whole area. The imaging system in FIG. 2a is operating in full field of regard (FOR) imaging mode and generates a relatively low resolution image of the whole FOR. The reconfigurable mask means can then be reconfigured to a high resolution mode shown in FIG. 2b where only a small area of the mask displays a finer resolution coded aperture array, the rest of the mask being opaque. Radiation can only reach the detector array 8 through the portion of the mask bearing the coded aperture array so only a narrow field of view (FOV) is observed but as the whole detector array receives radiation the resolution of the image is improved. The resolution and FOV of the system can thus be easily varied according to a particular need. For instance, were the imaging system to be used in a security surveillance system it could be operated generally in full FOR low resolution mode to monitor an area. However when needed a particular FOV could be selected for high resolution imaging. For instance, were motion in the image to be detected, either by an operator or automatically using image processing, the mask means could be reconfigured to give a high resolution image of the area in which the motion occurred.

It will be apparent that the field of view of the system is determined by the size and location of the coded aperture array displayed on the reconfigurable mask means. Varying the position of a small array on the mask means changes the field of view. Thus the field of view of the imaging system can be easily steered by simply reconfiguring the mask means to alter the position of the coded aperture array. FIG. 3 illustrates a series of mask patterns that could be used.

At time t=0 the whole mask means is in full FOR surveillance mode with a full size coded aperture array displayed. At time t=1 the system switches to a high resolution tracking and identification mode where only a portion of the mask displays a coded aperture array and the position is moved (t=2, 3 etc.) to track an object in the scene.

Figure 4:
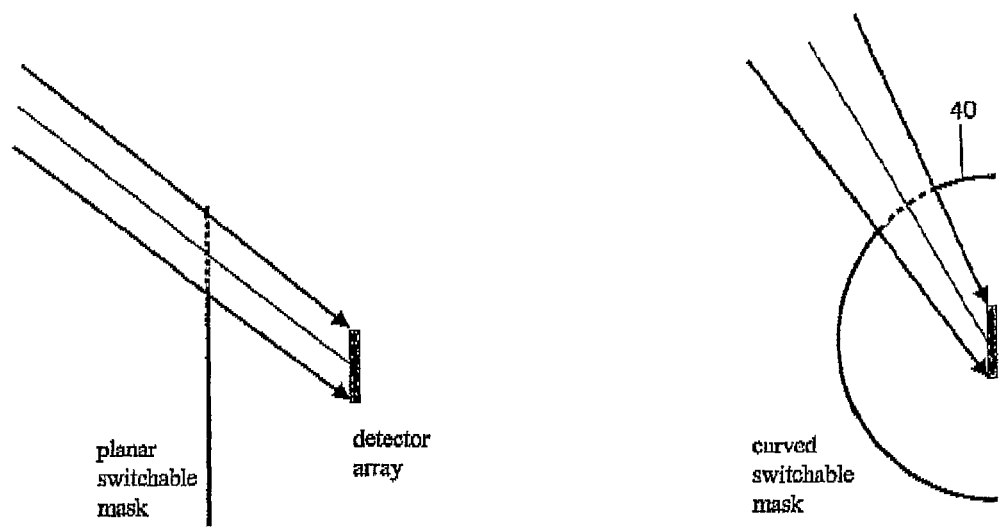
FIG. 4 shows a curved coded aperture mask means.
Figure 8:
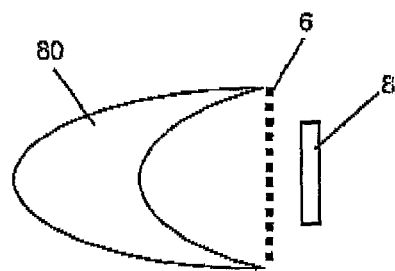
FIG. 8 shows a coded aperture imaging system arranged to image through a curved surface.

The present invention therefore provides a system with a rapidly reconfigurable coded mask, of sufficient extent to allow radiation from a large FOR to selectively fall on the detector array. A planar mask means, or a curved or faceted one, can be used. FIG. 4 shows an example of a curved mask means 40. As with the planar mask means a curved mask means but display different coded aperture arrays to provide different resolutions and can vary the position of the coded aperture array on the mask means to alter the FOV. However a curved mask means has the advantage of further increasing the FOR for a given system aperture, although is more difficult to fabricate. As mentioned above the coded aperture mask means may have a shape which is designed to match its surroundings in use. For instance if the imaging system is to be used in an aircraft wing a curved mask means may be used, the curve matching that of the wing shape. This means that in use the imaging system may be located at the appropriate part in the wing with an optimal FOV without compromising aerodynamics. Alternatively a planar or curved or faceted mask could be used and the system arranged to image through a curved surface such as a window in a wing or aircraft nose without suffering from unacceptable optical aberrations. FIG. 8 shows a coded aperture imaging system having a detector array 8 and coded aperture mask 6 arranged to image through a curved surface 82.

In all cases, the relatively wide system apertures necessitated by this CAI approach have a relatively small impact on system mass and inertia, as the thickness of the reconfigurable coded masks is determined purely by mechanical strength considerations. More conventional imaging approaches would require some form of optical power in the system aperture, and this would likely increase mass and moment of inertia significantly when compared to the CAI technique proposed here.

A feature of this approach, unlike most other systems with steerable FOV, is that there are no macroscopic moving parts in the CAI system. This gives rise to significant advantages in system response time, power requirements and vibration reduction. Depending upon the adaptive mask technology chosen, the agile imaging system's temporal performance will likely be limited by detector array integration and read-out times.

Key requirements of the adaptive mask means are that it is capable of being reconfigured; has pixels which can be switched rapidly (ideally <5 ms for some applications) to being either transparent or opaque over the waveband of interest; has a resolution capability to match that of detectors likely to be used with the system (~5 µm in the visible band through to 25 µm in the longwave thermal band (LWIR)). Advantageous requirements include the ability to be made on a curved substrate and being of a bistable transmission. The latter would contribute to low power operation of the system, with no energy being required for the mask when not being configured.

In the visible band, various liquid crystal display technologies can be employed. For instance ferroelectric liquid crystal devices can be used for visible and near infra red band masks (in principle, thermal band operation may also be possible too), being fast, intrinsically binary and with simple matrix addressing needs. They can also exhibit bistable behaviour. Switching speeds of <10 µs, pixel sizes down to 2 µm and devices with pixel counts in excess of $10^6$ pixels have been demonstrated. Alternatively bistable nematic liquid crystal technologies could be used, for example a surface grating aligned zenithally bistable liquid crystal such as described in U.S. Pat. No. 6,249,332. This is an example of a truly bistable technology, which can be manufactured using plastic substrates and is robust, being resistant to mechanical shock.

The skilled person would appreciate that other liquid crystal technologies may be used as the adaptive mask means. Some of these can also be used out to the thermal infrared, although switching speeds of some nematic liquid crystals can decrease with the square of the liquid crystal cell gap, which necessarily increases with the wavelength of operation. Nematic liquid crystal switching speed are governed by relaxation effects, and are consequently rather slow ~1 s at 10.6 µm. Again, ferroelectrics may be more appropriate, their switching being fully electrically driven. An additional consideration is that most relevant LC modes inevitably have some polarization dependence, necessitating polarisers and/ or waveplates for their operation. Whilst the added complexity and reduced optical transmission may be seen as a disadvantage, their properties may also be used to give added functionality to the imager e.g. polarisation discrimination or analysis.

Alternative non-polarisation dependent technologies include electrochromics (currently being pursued for e-book applications) and suspended particle devices of various types.

For infrared applications, vanadium dioxide modulators could be used for the adaptive masks. Thin-film vanadium dioxide ($VO_2$) undergoes shear phase transformations at 340K. The electrical and infrared optical properties of this material is dramatically impacted by this phase transformation. Below the phase transition temperature, $VO_2$ is a "poor" electrical insulator and has minimal absorption in the infrared spectral region. Above the phase transition temperature, $VO_2$ is a poor conductor and is opaque in the infrared. Rapid electrical switching (20 ns) between insulating and conducting phases has been demonstrated. This and related materials have been explored by several researchers for a variety of applications in the infra red and may be adapted for reconfigurable CAI mask use.

Another useful candidate technology for the reconfigurable mask means is a micro opto-electro-mechanical systems (MOEMS) spatial optical modulator. MOEMS optical modulators are known, some of which utilise optical interference effects to control the intensity and/or phase of a beam of light. For example, the modulator described in GB 0521251 utilises optical interference effects to control the intensity and/or phase of a beam (or beams) of light and is based on a single MOEMS optical modulator or an array of MOEMS optical modulators in which one or more moveable in mirrors are suspended above a substrate. This arrangement may be used in transmission for wavelengths where the substrate (for example silicon) is optically transmissive, and may be used in reflection for a substantially larger range of wavelengths. Modulators based on this type of technology are particularly useful for the present invention. Such a modulator is capable of modulating electromagnetic radiation having a plurality of wavelengths and/or angles of incidence or may be arranged to modulate electromagnetic radiation having a single wavelength.

The optical modulator may be adapted to modulate transmission of infrared radiation and, more preferably, of at least one of the short wave infrared (SWIR) radiation (0.8-2.5 µm), medium wave infrared (MWIR) radiation (3-5 µm) and long wave infrared (LWIR) radiation (8-14 µm) atmospheric windows. Conveniently, the optical modulator substrate is substantially transmissive to SWIR, MWIR and LWIR radiation. This characteristic refers to the transmission properties of a substrate layer in the optical modulator before the fabrication of the optical resonator thereon.

An important advantage of the adaptive CAI approach of the present invention is the ability to use a wide variety of detector technologies in the system. Many of the considerations for detector choice are identical to those for more conventional imaging systems. To maximize performance of the system, ideal detector array characteristics include high sensitivity and dynamic range, good signal to noise performance, high pixel counts and small pixel spacing. Uncooled operation is preferable for various reasons. Some ability to perform on chip predetector processing may be advantageous.

In the visible and near infra red bands, detector array technologies that may be used are complementary metal oxide semiconductor (CMOS) and charge coupled devices (COD). Both are available in pixel counts of more than 5 megapixels. CCDs are a mature technology, have the advantages of higher sensitivity (~1 order of magnitude better than CMOS), higher image quality (low fixed pattern noise), smaller pixel spacings (2.5 µm or less, compared to CMOS's 7-8 µm). However, the CMOS technology is still evolving and offers the ability to have auxiliary circuitry incorporated onto the detector chip (timing logic, exposure control, analogue to digital conversion, signal preprocessing etc). This allows single chip imaging solutions with lower system volume, and lower power consumption (by factors of ~3 to 10). A major advantage of CMOS technology for adaptable CAI imaging systems is the flexibility of image readout. Pixel binning (combining outputs from groups of pixels) and selective windowing (reading out part of array at high frame rates) are examples of this. Combined with appropriate digital processing architectures and algorithms, such modes of operation will allow various adaptable modes of operation.

In the thermal bands, a variety of cooled and uncooled thermal infrared detector technologies are available. Of these, cadmium mercury telluride (CMT) and indium antimonide (InSb) technologies are prime candidates for thermal band adaptive CAI. One important factor on CAI performance is the influence of detector noise. This is likely to be more of an issue in thermal band systems. Numerical simulations show that poor signal to noise ratios of detected intensity patterns have the effect of decreasing contrast of decoded images.

An advantage of the adaptive CAI approach of the present invention is its flexibility. A variety of decoding algorithms can be used. Depending on the apperception needs at the time, the most appropriate algorithms and parameters can be chosen accordingly. A priori known information can be updated at it becomes available and can improve performance further. Undecoded or partially decoded imagery can also be transmitted from the CAI system in a naturally encrypted form to a remote location to allow more sophisticated analysis, if required.

There are a variety of CAI decoding algorithms already available in the prior art, the majority of which have been developed for off line decoding involving the relatively low pixel count detectors associated with X-ray, g-ray and radiological imaging. For real time decoding applications, factors to be considered when choosing appropriate algorithms include optimisation with signal-to-noise characteristics of the detectors to be used, mask types, synergy with efficient decoding computer architectures and adaptability to support a variety of performance options.

In the most general case, the signal leaving the detector array D can be described by:

$$D(x,y) = S(x,y) \otimes A(x,y) + N(x,y) \quad (1)$$

where x,y are the lateral coordinates of the 2 dimensional signal distribution, S is the signal from the scene, A is the aperture function of the mask in the system, N is the noise introduced at the detector and $\otimes$ is the convolution operator. The object of all such algorithms is to recover part, or the whole, of S(x,y) with as few artifacts as possible. These artifacts can be quantified by various metrics, depending upon the application for which CAI is being used. For example, human viewing of the image may require a different metric being used than for automatic (machine based) interpretation; detection, identification and/or tracking will similarly require appropriate optimisations.

Deconvolution Methods

Figure 5:
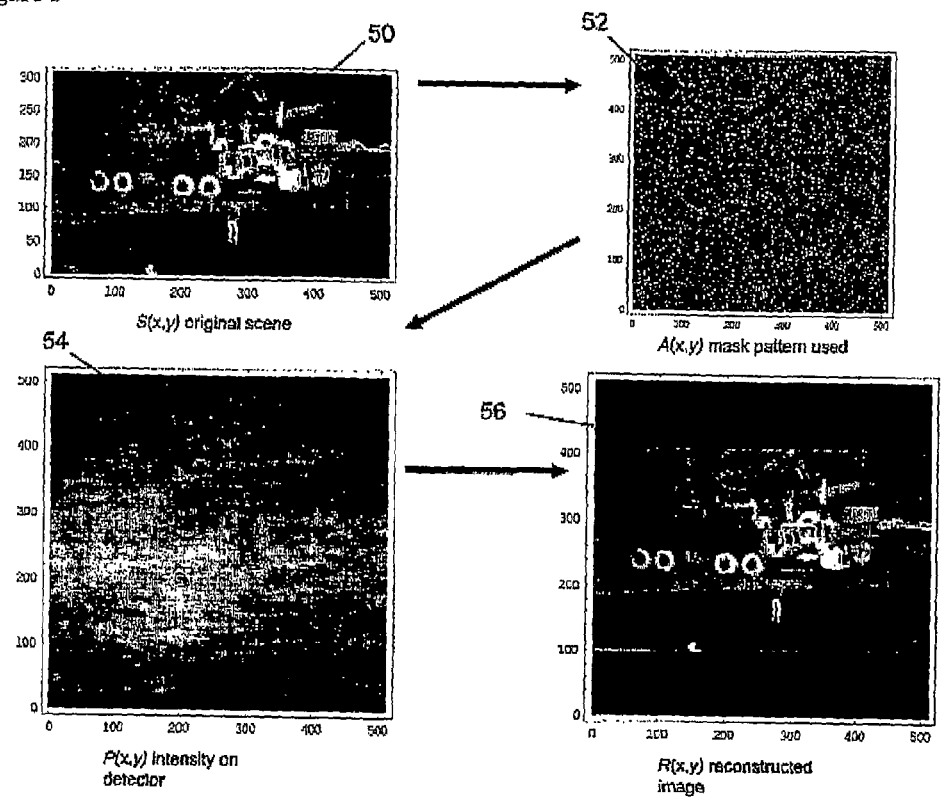
FIG. 5 shows a simulation of a scene, a typical mask pattern, the intensity pattern at the detector array and the decoded image.

Decoding occurs using a deconvolution:

$$S'(x,y) = F^{-1}[F(D(x,y))/F(A(x,y))] = S(x,y) + F^{-1}[F(N(x,y)/F(A(x,y))] \quad (2)$$

where F is the Fourier Transform operator. While computationally efficient, F(A(x,y)) can have small terms (a general property of large binary arrays, for example), resulting in a noisy reconstruction. Appropriate mask design will minimize this effect. It is well known that accurate deconvolution is susceptible to noise, so detector noise may affect this algorithm more than some others. As in many Fourier based approaches, the speed of the Fast Fourier Transform (FFT) can result in efficient computational implementation of this algorithm. FIG. 5 shows results of using this algorithm. The original 3-5 µm band scene 50 was imaged using a random binary mask 52. It can be seen that the pixel intensity 54 recorded at the detector array is an encoded patter. This was decoded to yield a high quality version 66 of the original image using the inversion algorithm.

Cross-Correlation Methods

In this technique, S(x,y) is decoded by correlating D(x,y) with an array G(x,y)

$$S'(x,y) = D(x,y) \oplus G(x,y) = S(x,y) \otimes A(x,y) \ominus (x,y) + N(x,y)) \oplus A(x,y) \quad (3)$$

In the simple case of G=A, and the mask design A is such that its auto correlation approximates well to a delta function, with small sidelobes. Uniform redundant arrays were developed to achieve this with small array dimensions. If this is the case, then a reasonable quality reconstruction can be achieved. However, the real positive nature of the mask functions will result in a pedestal of 0.5 times the peak value of the autocorrelation, even in the ideal case, with associated decrease in reconstruction quality compared to the ideal case deconvolution algorithm. More generally, G is chosen such that G≠A. In this case, the method is known as "balanced cross correlation" and appropriate choice of G can result in good quality reconstructions.

Again a Fourier based implementation can be computationally efficient. A closely related approach is Wiener filtering, where a weighted cross correlation is used. This approach is useful for masks which have poor autocorrelation functions.

Initial indications are that, in the ideal noise free case (N=0) the cross correlation methods produce inferior reconstructions when compared to the deconvolution algorithm. However, for N>0, the cross correlation may be more robust.

Where the mask means provides more than one distinct coded aperture array at different locations, so as to provide simultaneous different fields of view the detector array will actually be the sum of all the intensity patterns contributed by each of the coded aperture array. However the processing the signal based on the aperture pattern for any one of the arrays will reveal just the image as seen by that array. Thus the image associated with each separate field of view can be recovered.

Iterative Recovery Methods

Iterative searches of solution space can be used to recover high quality images. Examples of these techniques include the maximum entropy method and Land Weber algorithms. These are more flexible can allow incorporation of a priori information, prioritised decoding and minimization of effects due to noise. While very high quality reconstructions can be achieved, the iterative nature of these algorithms make them relatively slow, especially for large array sizes.

Photon Tagging

By back projecting detected photons through the mask towards specific angular positions in the scene, it is possible to reconstruct images over selected regions. In this way available computational resources can be directed at parts of the scene of interest. This approach is therefore another valuable technique for foveated and flexible imaging of a scene using CAI techniques.

3D Image Retrieval

Figure 6:
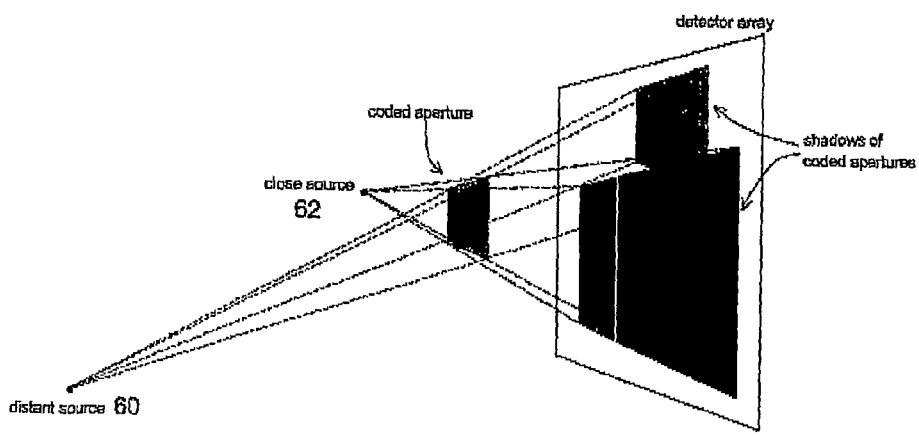
FIG. 6 shows the principle of 3D imaging using a coded aperture imaging system.

CAI has been used for 3D image retrieval in applications such as nuclear medicine. In such applications, CAI is often termed "incoherent holography". The reason for this is that the CAI image is a 2 dimensional intensity distribution (as are many holograms), and by appropriate choice of decoding kernels (akin to use of the correct "reference wave" in holography), 3D information of the scene can be retrieved. The depth resolution is typically an order of magnitude less than the x-y resolution. FIG. 6 illustrates the simple principle: sources further away from the system 60 cast smaller shadows of the coded aperture than those closer in 62.

Clearly such a mode of operation will be valuable in many applications. Mask designs based on powerful nonlinear optimisations show promise in realising high quality 3-Dimensional system point spread functions.

There are a variety of digital processing technologies available, which allow video rate post-processing and decoding of imagery of the detected intensities. In addition to on-detector-chip processing (as might be possible by a CMOS detector array, for example), these include CPUs and Graphics Processors (GPUs) and clusters thereof, digital signal processing (DSP) chips, field programmable arrays (FPGAs) and application specific integrated circuits (ASICs). FPGAs are attractive as they are flexible and can be implemented economically and reconfigured so will generally be used in systems requiring flexibility. For production systems ASICs are likely to be used. They have higher performance, lower mass and power consumption and lower unit costs in quantity.

In addition to customized algorithm implementation, both FPGAs and ASICs offer superior performance when compared to general-purpose central processing units (CPUs). For example, current performances of CPU/FPGA/ASIC are ~1-2 Gflop/20 Gflop/200 Gflop (Gflop=giga floating point operations per second). Gigabit per second date transfer rates are possible with both FPGA and ASIC devices. The power consumption of DSP, FPGAs and ASIC is also advantageous when compared to CPU. As an example of the current state of the art, a known high throughput fast Fourier transform (FFT) core performs a 1024×1024 8 bit FFT in 8.4 ms and deconvolution or correlation operations involving 2 FFTs and scalar multiplication with a precomputed kernel (as used in some classes of CAI decoding algorithms) in ~17 ms.

It will be apparent from the foregoing that decoding the received intensity pattern requires knowledge of the mask aperture function of the particular coded aperture array used. Usually the mask aperture function is calculated theoretically using a knowledge of the mask and its location relative to the detector array. However this requires precise alignment of the mask. Any misalignment in orientation is particularly important as rotation of the mask can result in a different pattern being perceived by the detector.

To reduce the need for precise alignment and improve accuracy of processing a calibration type step may involve imaging a reference object using the coded aperture imaging apparatus and using the intensity pattern on the detector array due to the reference object to form a decoding pattern. If a coded aperture imaging (CAI) system with a particular coded aperture is used to image a point source the intensity pattern on the detector will effectively be the shadow cast by the coded aperture. This intensity pattern therefore gives the decoding pattern required for that particular coded aperture at that particular location and orientation relative to the detector array.

This intensity pattern is therefore recorded and may be used directly as the mask pattern in the decoding algorithm. Using the mask pattern directly can have the advantage that any diffraction effects of the mask are present in the recorded intensity pattern. As mentioned previously CAI is a purely geometric imaging technique. As a result, any diffraction caused by the coded aperture mask can be expected to adversely affect imaging performance. For a given wavelength, diffraction will become more significant as the mask to detector distance increases and as the mask aperture decreases.

Capturing an image of the coded aperture mask which inherently includes diffraction effects may offer advantages in image quality when processing.

The captured pattern could be processed prior to being stored for instance to improve contrast.

Alternatively the theoretical mask pattern could be used but the data recorded when imaging the reference object could be used to determine the degree of misalignment of the actual coded aperture array. The captured intensity pattern could be correlated with the theoretical pattern and, based on the correlation, any adjustment, e.g. to orientation, applied to the theoretical pattern. A practical method for doing is to examine the correlation between the captured intensity pattern and scaled and rotate versions of the theoretical pattern. The one yielding the highest correlation peak will indicate the scale and orientation of the captured pattern.

As the coded aperture mask means is reconfigurable it may be reconfigurable to any one of several different masks, each having a different coded aperture array and/or the coded aperture array located at a different position on the mask means. It is therefore convenient to image a suitably located reference object with each different mask configuration and use the intensity pattern at the detector to determine a decoding pattern for each different configuration.

As mentioned elsewhere the present invention allows use of a curved coded aperture array. Generating a theoretical decoding pattern for such a curved coded aperture array can involve significant computation. Using a curved coded aperture array with a detector array allows the decoding pattern to be determined directly without requiring any processing.

The point source could be a laser beam focused to a point with a microscope objective. For distant imaging applications, the point source could be a flare in the scene or a retro-reflector illuminated by a laser. Obviously when recording an intensity pattern from a point source the intensity level of the rest of the scene should be low compared to the intensity of the point source. A wavelength specific point source could be used to ensure the intensity of the point source or the point source could have a modulated output and processing of the intensity pattern on the detector array could be used to extract the signal having a matching modulation and therefore corresponding to the point source.

Using a point source in the field of view in use can also be advantageous when imaging over long distances as it allows for atmospheric aberration correction. A point source such as a retro-reflector illuminated by a strong illumination means such as a laser could be located in the scene. Any atmospheric aberration, i.e. distortion of the optical signal, caused by the propagation of the radiation through the atmosphere would result in the point source having a distorted shape as perceived at the coded aperture imager. The intensity pattern received at the detector array will then be the intensity pattern caused by the mask being illuminated by such a distorted source. This intensity pattern can then be used as the decoding pattern for the purposes of decoding any image. An image of the distorted point source decoded using such a pattern would actually give an image of the undistorted point source. Therefore if a point source is located within the scene to be imaged and the intensity pattern created by that point source is used as the decoding pattern any distortions in the propagation of the radiation from the scene to the imager will be compensated for.

As mentioned CAI is a purely geometric imaging technique. As a result, any diffraction caused by the coded aperture mask can be expected to adversely affect imaging performance. For a given wavelength, diffraction will become more significant as the mask to detector distance increases and as the mask aperture decreases. For the case of maximum angular resolution of a CAI based imager, the mask aperture spacings are similar in size to the detector pixel spacings and typically ~10 times the size of the wavelength of the light being imaged. Calculations show that significant diffraction occurs in such situations.

Figure 7:
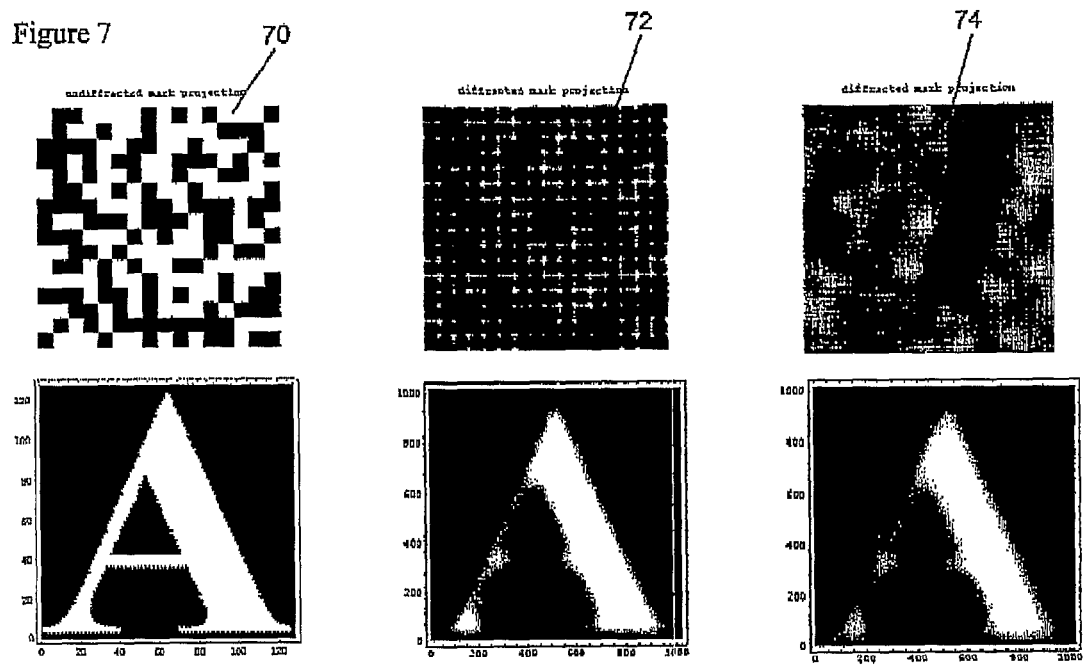
FIG. 7 shows the results of numerical calculations simulating the effect of diffraction on image quality using a deconvolution algorithm.

Fortunately, it has been found that the impact of diffraction on decoded image quality is not as severe as might be expected: even with simple deconvolution kernels, good images can be recovered. An example is shown in FIG. 7 which shows a simulation of three projected mask patterns with different amounts of diffraction, an diffracted mask projection 70, some diffraction 72 and severe diffraction 74. The bottom row represents the reconstructed images and it can be seen that diffraction does have some impact on image quality. A basic deconvolution was used in these simulations with a non-diffracted kernel.

The effects of diffraction can be further minimised by the use of more sophisticated algorithms, for instance using multiple frames of data, and/or the use of specially designed apertures, such as soft aperture functions. These could be formed by greyscale transmission functions or be of the binary transmission type where the edges of the aperture have a sub wavelength structure. It is also possible to use a mask which has a pattern that deliberately causes diffraction of incident radiation of the waveband of interest and produces a diffraction pattern on the detector array that is a well conditioned coded pattern, i.e. the diffraction pattern formed at the detector array has a sharp autocorrelation function with small sidelobes when the system is imaging a single point from the scene. In other words the mask could be designed with diffraction in mind and rely on diffraction to produce the coded pattern.

Use of a mask which is designed to cause diffraction is similar to conventional coded aperture imaging in that it produces a coded pattern which can be decoded to reconstruct the scene image. However, unlike conventional coded aperture imaging where the mask pattern is designed to be well conditioned and ensure that there is minimal diffraction and any diffraction effects from the mask are compensated for in processing, one could deliberately use a mask pattern which causes diffraction but ensures that the diffracted pattern is itself well conditioned.

This means that it is the feature size of the projected pattern on the detector array which determines the angular resolution. This is not necessarily directly related to the feature size of the coded diffractive mask (as is the case for standard coded aperture imaging) which allows a certain amount of greater design freedom.

It should be noted that the use of a coded aperture mask that is designed with diffraction in mind is quite different from the approach of using diffractive lenses such as described in WO2000/17810. Imagers using diffractive lenses replace a conventional lens with a diffractive element which has the same functionality. Thus these systems teach diffractive lenses which focus radiation to form an image at the detector plane where, as in conventional imaging, the spatial intensity at the detector array is the spatial intensity of the image. The mask of the present invention does not focus radiation and does not produce an image in the detector plane. A point source imaged by an imager having a diffractive lens would produce a point on the detector array. Were a coded aperture array arranged to image the same point the result would be a coded intensity pattern on the detector array (or a significant part of it), i.e. an intensity pattern which is different to the image which would need to be decoded to reconstruct the image. The use of a mask designed with diffraction in mind simply means that at the wavelength of interest the intensity pattern on the detector array is well conditioned.

Given that the diffractive mask generates a well conditioned pattern at the detector array simple decoding algorithms can be used based on the diffraction pattern is a manner analogous to conventional coded aperture imaging. More advanced decoding techniques may be used to improve resolution.

Detector noise is likely to be more of an issue in thermal band systems. The situation is exacerbated by the absorption of at least half of the incoming scene energy by the binary CAI mask itself. Numerical simulations by the present inventors show that poor signal to noise ratios of detected intensity patterns have the effect of decreasing contrast of decoded images. More sophisticated algorithms may reduce these effects.

As mentioned above the use of multiple frame imaging is particularly advantageous in improving image quality and/or resolution. A plurality of different coded aperture masks are used to image the scene and the data from the multiple frames combined. The use of several different masks can reduce noise in the signal and can also increase the resolution of the final image. The number of different masks used may vary depending on the application and on the scene evolution. For instance in a slowly changing scene or where a high quality image is need several different frames may be acquired, for instance ten, or twenty or fifty or a hundred. In a rapidly changing scene or when tracking moving targets fewer frames may be combined. However the present invention offers the ability to alter the number of frames combined and the mask patterns used as required.

The invention claimed is:

1. A coded aperture imaging system configured to operate in the ultra violet, visible or infrared wavelength interval and comprising a detector array and a coded aperture mask, the coded aperture mask is electrically reconfigurable to produce coded aperture arrays providing one of:
   different fields of view,
   different resolutions, and
   different image encryption properties.

2. An imaging system as claimed in claim 1 wherein the coded aperture arrays provide different fields of view, each coded aperture array occupies part of the coded aperture mask and the position of each coded aperture array in the mask defines the respective field of view.

3. A coded aperture imaging system comprising a detector array and a coded aperture mask which is reconfigurable, and the reconfigurable coded aperture mask incorporates a controller adapted to cause at least one coded aperture mask to provide a coded aperture array.

4. An imaging system as claimed in claim 3 wherein the controller is pre-programmed with a plurality of different coded aperture arrays for displaying on the coded aperture mask.

5. An imaging system as claimed in claim 1 wherein the coded aperture mask is non-planar.

6. An imaging system as claimed in claim 1 wherein the coded aperture mask is reconfigurable in less than 10 ms.

7. An imaging system as claimed in claim 1 wherein the coded aperture mask comprises a bistable spatial light modulator.

8. An imaging system as claimed in claim 1 wherein the coded aperture mask comprises a liquid crystal spatial light modulator.

9. An imaging system as claimed in claim 1 wherein said detector array has an output and including a processor adapted to decode the detector array output to provide an image.

10. An imaging system as claimed in claim 9 wherein the processor is adapted to apply a variety of decoding algorithms to decode the detector array output.

11. An imaging system as claimed in claim 9 wherein the processor is arranged to combine multiple frames of data from the detector array output, the frames having been acquired with different coded aperture arrays.

12. An imaging system as claimed in claim 1, wherein the detector array output is undecoded and the system comprises at least one of a transmitter and a recorder for at least one of transmitting and recording the undecoded detector array output.

13. An imaging system as claimed in claim 12 wherein the reconfigurable coded aperture mask is adapted to vary the coded aperture array displayed in order to vary image encryption.

14. A method of imaging comprising the steps of:
arranging a detector array to view a scene through a reconfigurable coded aperture array; and
causing a coded aperture array to be displayed on the coded aperture mask.

15. A method of imaging as claimed in claim 14, further comprising the step of displaying a first coded aperture array on the coded aperture mask and subsequently displaying a second coded aperture array to the coded aperture mask.

16. A method of imaging as claimed in claim 15 wherein the first and second coded aperture arrays have different fields of view and/or resolution.

17. A method of imaging as claimed in claim 14 wherein the method comprises the step of decoding the output of the detector array to provide an image.

18. A method as claimed in claim 17 wherein the step of decoding comprises applying one or more of a deconvolution algorithm, a cross-correlation algorithm and an iterative solution search.

19. A method as claimed in claim 15 wherein the method involves combining data acquired using a plurality of different coded aperture arrays in decoding the image.

20. A method of imaging as claimed in claim 14 including imaging through a non-planar element.

21. A method of imaging as claimed in claim 20 wherein the non-planar element forms part of an external surface of a platform.

22. A method of imaging as claimed in claim 20 wherein the non-planar element has an aerodynamic shape.

23. A coded aperture imaging system as claimed in claim 1 wherein the coded aperture imaging system has a plurality of detector arrays each arranged to receive radiation from a scene through the coded aperture mask.

24. A coded aperture imaging system as claimed in claim 23 wherein each detector array has an active detector area for receiving radiation and a non-active peripheral area.

25. A coded aperture imaging system as claimed in claim 24 wherein the active area of at least one detector array is not coterminous with the active area of a neighbouring detector array.

26. A method of coded aperture imaging in the ultra violet, visible or infrared wavelength interval and comprising the steps of:
arranging a detector array to view a scene through a display; and
displaying a selected coded aperture array on a coded aperture mask to provide for the display to form the selected coded aperture array, wherein the display is reconfigurable to produce coded aperture arrays arranged to provide one of:
different fields of view,
different resolutions, and
different image encryption properties.

27. An imaging system as claimed in claim 1 wherein the coded aperture mask has pixels which are electrically switchable between transparent and opaque states to provide different coded aperture arrays.

28. An imaging system as claimed in claim 5 wherein the non-planar coded aperture mask forms part of an external surface of a platform.

29. An imaging system as claimed in claim 28 wherein the non-planar coded aperture mask has an aerodynamic shape.

* * * * *